(12) United States Patent
Stanyschöfsky et al.

(10) Patent No.: US 9,493,659 B2
(45) Date of Patent: Nov. 15, 2016

(54) CARBON BLACK, METHOD FOR THE PRODUCTION THEREOF, AND USE THEREOF

(75) Inventors: Michael Stanyschöfsky, Hürth (DE);
(Continued)

(73) Assignee: EVONIK CARBON BLACK GMBH, Hanau (DE)

( * ) Notice: Subject to any disclaimer, the term of this patent is extended or adjusted under 35 U.S.C. 154(b) by 705 days.

(21) Appl. No.: 13/124,583

(22) PCT Filed: Oct. 9, 2009

(86) PCT No.: PCT/EP2009/063171
§ 371 (c)(1),
(2), (4) Date: Jun. 3, 2011

(87) PCT Pub. No.: WO2010/043562
PCT Pub. Date: Apr. 22, 2010

(65) Prior Publication Data
US 2011/0236816 A1    Sep. 29, 2011

(30) Foreign Application Priority Data
Oct. 16, 2008    (DE) .................. 10 2008 051 886

(51) Int. Cl.
*G03G 9/09*    (2006.01)
*C09D 11/02*    (2014.01)
(Continued)

(52) U.S. Cl.
CPC . *C09C 1/50* (2013.01); *C09C 1/44* (2013.01); *C09C 1/52* (2013.01); *C09C 1/54* (2013.01);
(Continued)

(58) Field of Classification Search
CPC ............... C01P 2004/51; C01P 2006/12; C01P 2006/19; C09C 1/44; C09C 1/50;
(Continued)

(56) References Cited

U.S. PATENT DOCUMENTS

| 4,327,069 A | 4/1982 | Cheng |
| 4,927,607 A | 5/1990 | Berg et al. |

(Continued)

FOREIGN PATENT DOCUMENTS

| DE | 287015 | * 2/1991 | ............... C01B 3/26 |
| EP | 0 384 080 | 8/1990 | |

(Continued)

OTHER PUBLICATIONS

"Carbon Black" under "Carbon" in ECT 1st ed., vol. 3, pp. 34-65, and Suppl. 1, pp. 130-144, by W. R. Smith, Godfrey L. Cabot, Inc.; "Acetylene Black" in ECT 1st ed., vol. 3, pp. 66-69, by B. P. Buckley, Shawinigan Chemicals Ltd.; "Carbon Black" under "Carbon" in ECT 2nd ed., vol. 4, pp. 243-282, by W. R. Smith, Cabot Corp., D. C. Bean.*

(Continued)

*Primary Examiner* — Shuangyi Abu Ali
(74) *Attorney, Agent, or Firm* — Smith, Gambrell & Russell, LLP

(57) ABSTRACT

The invention relates to carbon black having a C-14 content greater than 0.05 Bq/g and a ratio ΔD50/Dmode of the aggregate size distribution of less than 0.7. The carbon black is produced by thermal oxidative pyrolysis or thermal cleavage of the carbon black raw material in that the carbon black raw material contains renewable carbon black raw materials and an oxygen deficiency is present in the pyrolysis/cleavage reaction. The carbon blacks can be used in rubber and rubber mixtures, plastic, printing inks, inks, inkjet inks, toners, lacquers, paints, paper, adhesives, batteries, pastes, bitumens, concrete, and other building materials and as reducing agents in metallurgy.

12 Claims, 1 Drawing Sheet

(75) Inventors: Gernot Meinerzhagen, Leverkusen (DE); Paul Messer, Brühl (DE); Joachim Fröhlich, Neumarkt (DE)

(51) Int. Cl.

| | | |
|---|---|---|
| C09D 1/00 | (2006.01) | |
| D21H 17/03 | (2006.01) | |
| C08L 9/00 | (2006.01) | |
| C09D 11/00 | (2014.01) | |
| C04B 14/36 | (2006.01) | |
| C09C 1/48 | (2006.01) | |
| C09C 1/56 | (2006.01) | |
| C09C 1/50 | (2006.01) | |
| C09C 1/44 | (2006.01) | |
| C09C 1/52 | (2006.01) | |
| C09C 1/54 | (2006.01) | |
| C09D 11/037 | (2014.01) | |
| C09D 11/324 | (2014.01) | |

(52) U.S. Cl.
CPC ........... *C09D 11/037* (2013.01); *C09D 11/324* (2013.01); *C01P 2004/51* (2013.01); *C01P 2006/12* (2013.01); *C01P 2006/19* (2013.01)

(58) Field of Classification Search
CPC ........... C09C 1/52; C09C 1/54; C09D 11/037; C09D 11/324
USPC ........................................ 106/472; 423/449.1
See application file for complete search history.

(56) References Cited

U.S. PATENT DOCUMENTS

| | | | |
|---|---|---|---|
| 5,516,833 A | 5/1996 | Ohashi et al. | |
| 5,772,975 A | 6/1998 | Mise et al. | |
| 5,859,120 A | 1/1999 | Karl et al. | |
| 6,228,928 B1 * | 5/2001 | Soeda et al. | 524/495 |
| 7,655,209 B2 * | 2/2010 | Rumpf et al. | 423/449.1 |
| 2004/0248731 A1 | 12/2004 | Vogel et al. | |
| 2005/0256249 A1 | 11/2005 | Wang et al. | |
| 2008/0219915 A1 | 9/2008 | Quitmann et al. | |
| 2011/0034611 A1 | 2/2011 | Pelster et al. | |

FOREIGN PATENT DOCUMENTS

| | | |
|---|---|---|
| EP | 0 754 735 | 1/1997 |
| EP | 0 792 920 A1 | 9/1997 |
| EP | 0 799 866 A2 | 10/1997 |
| EP | 0 799 866 A3 | 5/1999 |
| EP | 0 949 303 | 10/1999 |
| EP | 0 982 378 A1 | 3/2000 |
| EP | 1 783 178 | 5/2007 |
| GB | 699406 | 11/1953 |
| JP | H06-500138 | 1/1994 |
| JP | H09-235485 | 9/1997 |
| JP | H11-335584 | 12/1999 |
| JP | 2005-336442 | 12/2005 |
| JP | 2005-350335 | 12/2005 |
| JP | 2007-112879 | 5/2007 |
| JP | 2007-269259 | 10/2007 |
| KR | 10-1998-0033393 | 7/1998 |
| WO | 91/13944 | 9/1991 |
| WO | 92/04415 | 3/1992 |
| WO | 00/32701 | 6/2000 |

OTHER PUBLICATIONS

International Search Report for PCT/EP2009/063171 mailed Dec. 30, 2009.
International Search Report for PCT/EP2008/061701 mailed Sep. 16, 2009.
C. J. Stacy et al., "Effect of Carbon Black Structure Aggregate Size Distribution on Properties of Reinforced Rubber", (Presented at a meeting of the Rubber Division, American Chemical Society, Cleveland Ohio, May 6-9, 1975), Rubber Chemistry and Technology, vol. 48, pp. 538-547.
W. M. Hess et al., "The Effects of Carbon Black and Other Compounding Variables on Tire Rolling Resistance and Traction", (Presented at a meeting of the Rubber Division, American Chemical Society, Chicago Illinois, Oct. 5-7, 1982), Rubber Chemistry and Technology, vol. 56, pp. 390-417.
Gerard Kraus, "Reinforcement of Elastomers by Carbon Black", Phillips Petroleum Company, Bartlesville, Oklahoma, USA, received Feb. 27, 1976, pp. 215-248.
PCT Notification Concerning Transmittal of International Preliminary Report on Patentability (Form PCT/IB/326) for PCT/EP2008/061701 mailed Apr. 15, 2010 (in English language).
PCT International Preliminary Report on Patentability (Form PCT/IB/373) for PCT/EP2008/061701 dated Apr. 7, 2010 (in English language).
PCT Written Opinion of the International Searching Authority (Form/ISA/237) for PCT/EP2008/061701 dated Apr. 7, 2010 (in English language).
International Standard, ISO 15825:2004(E), First Edition Nov. 1, 2004, "Rubber compounding ingredients—Carbon black—Determination of aggregate size distribution by disc centrifuge photosedimentometry", Normen-Download-Beuth-Degussa AG-KdNr.20235-LfNr.2904069001—Aug. 16, 2005.
ASTM International, Designation: D 1510-06a, "Standard Test Method for Carbon Black—Iodine Adsorption Number", (2006).
ASTM International, Designation: D 1619-03, "Standard Test Methods for Carbon Black—Sulfur Content", (2003).
ASTM International, Designation: D 2414-05a, "Standard Test Method for Carbon Black—Oil Absorption Number (OAN)", (2005).
ASTM International, Designation: D 3265-05, "Standard Test Method for Carbon Black—Tint Strength", (2005).
ASTM International, Designation: D 3493-04a, "Standard Test Method for Carbon Black—Oil Absorption Number of Compressed Sample (COAN)", (2004).
ASTM International, Designation: D 3765-04, "Standard Test Method for Carbon Black—CTAB (Cetyltrimethylammonium Bromide) Surface Area", (2004).
ASTM International, Designation: D 3849-04, "Standard Test Method for Carbon Black—Morphological Characterization of Carbon Black Using Electron Microscopy", (2004).
ASTM International, Designation: D 4527-99 (Reapproved 2004), "Standard Test Method for Carbon Black—Solvent Extractables".
ASTM International, Designation: D 6556-04 "Standard Test Method for Carbon Black—Total and External Surface Area by Nitrogen Adsorption", (2004).
DIN 53552, "Bestimmung des Gehaltes der beim Glühen flüchtigen Bestandteile von Ruβ", Sep. 1977, DK 661.66.4:678.046:620. 1:543.713 (Testing of carbon black; determination of the content of matter volatile on glowing in carbon black).
ASTM International, Designation: D 5373-08 "Standard Test Methods for Instrumental Determination of Carbon, Hydrogen, and Nitrogen in Laboratory Samples of Coal", (2008).
ASTM International, Designation: D 5291-02 (Reapproved 2007) "Standard Test Methods for Instrumental Determination of Carbon, Hydrogen, and Nitrogen in Petroleum Products and Lubricants".
W. Hofmann, Kautschuktechnologie (Rubber technology), Genter Verlag, Sturrgart, 1980 (pp. 24-31, pp. 62-67 and pp. 70-75).
PCT Notification Concerning Transmittal of International Preliminary Report on Patentability (Form PCT/IB/326) for PCT/EP2009/063171 mailed Apr. 28, 2011(in English language).
PCT Notification of Transmittal of Translation of International Preliminary Report on Patentability (Form PCT/IB/338) for PCT/EP2009/063171 mailed Apr. 28, 2011(in English language).
PCT International Preliminary Report on Patentability (Form PCT/IB/373) for PCT/EP2009/063171 issued Apr. 19, 2011 (in English language).

(56) References Cited

OTHER PUBLICATIONS

PCT Written Opinion of the International Searching Authority (Form/ISA/237) for PCT/EP2009/063171 issued Apr. 19, 2011 (with English language translation).
Hydroisotop GmbH "Nachwachsende Rohstoffe, Sekundärbreennstoffe", Hydroisotop GmbH, as retrieved from http://www.hydroisotop.de/sites/default/files/dokumente/Nachwachsende_Rohstoffe_Radiocarbonmethode.pdf on Oct. 21, 2015 (4 pages).
Dr. R. Edler, Dr. Lauri Kaihola: "LSC Application Note 43. Determination of the C14 content in fuels containing bioethanol and other biogenic materials with liquid scintillation counting", May 2007, XP55223081, as retrieved from http://www.perkinelmer.com/pdfs/downloads/APP_Determination-of-Carbon-14-in-fuels-containing-Bioethanol-and-other-Biogenic-Materials-with-Liquid-Scintillation-Counting.pdf on Oct. 22, 2015 (11 Pages).
ASTM International, Designation: D 1512-05, "Standard Test Methods for Carbon Black—pH Value", (2005).
ASTM International, Designation: D 1618-99 (Reapproved 2004), "Standard Test Methods for Carbon Black Extractables—Transmittance of Toluene Extract", (1999).

\* cited by examiner

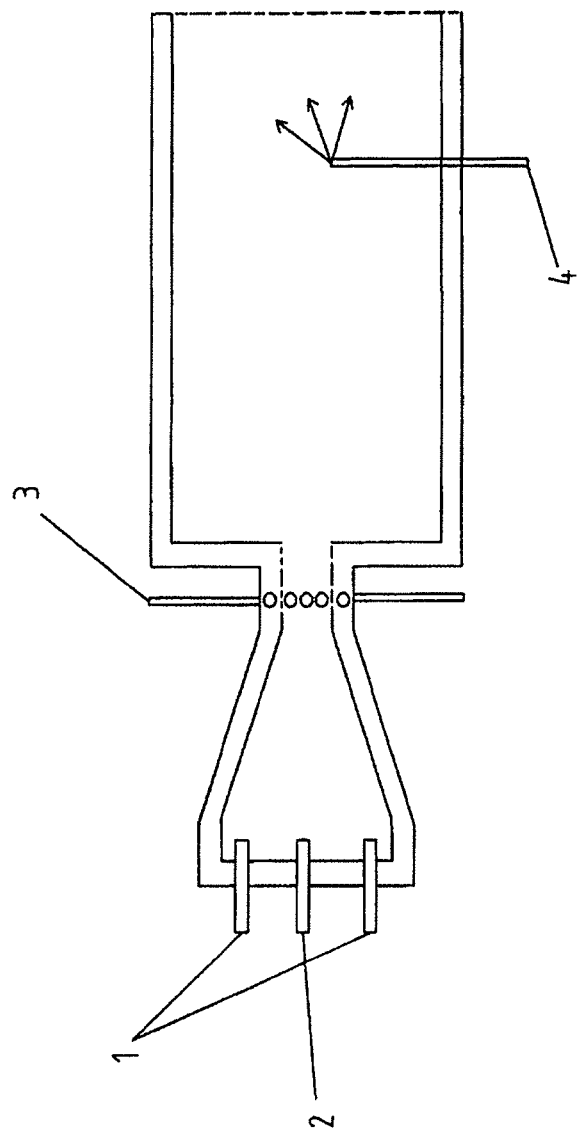

CARBON BLACK, METHOD FOR THE PRODUCTION THEREOF, AND USE THEREOF

BACKGROUND OF THE INVENTION

The invention relates to carbon black, to a process for producing the same, and also to use of the same.

EP 0792920, EP 0982378, U.S. Pat. No. 5,516,833 and WO 92/04415 disclose furnace blacks which have a narrow aggregate size distribution.

The known carbon blacks have the disadvantage of low C-14 content, indicating low or zero content of non-renewable feedstock.

SUMMARY OF THE INVENTION

It is an object of the present invention to provide a carbon black which has high C-14 content derived from renewable feedstock, and which has a narrow aggregate size distribution and high modulus.

BRIEF DESCRIPTION OF THE DRAWING

FIG. 1 shows a longitudinal section through the furnace reactor.

DETAILED DESCRIPTION OF THE INVENTION

The invention provides a carbon black, characterized in that the C-14 content of the carbon black is greater than 0.05 Bq/g, preferably greater than 0.10 Bq/g, particularly preferably greater than 0.15 Bq/g, very particularly preferably greater than 0.25 Bq/g, and the ΔD50/Dmode ratio of the aggregate size distribution is smaller than 0.7, preferably smaller than 0.65, particularly preferably smaller than 0.6.

C-14 content is determined as follows:

1. Digestion of the Sample

The aim of digestion of the sample is to isolate the carbon analyte ($^{14}C$ and $C_{stable}$) from other substances that might interfere, and to concentrate a maximum amount of carbon into minimum volume, in order to create ideal measurement conditions. To this end, the carbon black is subjected to combustion in a quartz glass tube using an excess of oxygen, and thus converted to carbon dioxide.

2. Radiochemical Purification

The said carbon dioxide is dissolved in sodium hydroxide solution to give carbonate. To prepare the sample for measurement, the carbonate is precipitated by means of $BaCO_3$, because the volume of the solution is firstly still too great, and the scintillation cocktail for low-level LSC does not tolerate excessively high pHs.

3. $^{14}C$ Activity Determination by Means of Quantulus 1220 LSC

The precipitate is filtered and transferred to a 20 mL measuring vessel (LSC vial). It has proved advisable to transfer no more than about 1.5 g of $BaCO_3$ to the measurement vessel, since otherwise the measurement results would of course be excessively distorted by radionuclides occurring in the barium compound and derived from the radioactive decay chain based on uranium or on thorium. The solutions without precipitated $BaCO_3$ serve as control. In order to avoid entraining any additional carbon which would distort the results, double-distilled water is used for the solutions. About 14 mL of QSA scintillation cocktail are admixed with the test specimen. The mixture of sample and scintillation cocktail is then vigorously shaken and subjected to measurement in the Quantulus 1220 LSC. The measurement process uses a cooling time of about 180 minutes and a measurement time of 1000 minutes.

Aggregate size distribution is determined in accordance with the standard ISO 15825, first edition, on 1 Nov. 2004, modified as follows:

1. Supplement to paragraph 4.6.3 of standard ISO 15825: Dmode is based on the mass distribution curve.

2. Supplement to paragraph 5.1 of standard ISO 15825: BI-DCP particle sizer equipment used with the associated dcplw32 evaluation software, Version 3.81, all obtainable from Brookhaven Instruments Corporation, 750 Blue Point Rd., Holtsville, N.Y., 11742.

3. Supplement to paragraph 5.2 of standard ISO 15825: The following equipment is used: GM2200 ultrasound control equipment, UW2200 acoustic transducer, and a DH13G sonotrode. The ultrasound control equipment, acoustic transducer and sonotrode are obtainable from Bandelin electronic GmbH & Co. Kg, Heinrichstraße 3-4, D-12207 Berlin. The following values are set here on the ultrasound control equipment: power %=50, cycle=8. This corresponds to a nominal set power level of 100 Watts and to a set pulse level of 80%.

4. Supplement to paragraph 5.2.1 of standard ISO 15825: The ultrasound time is defined as 4.5 minutes.

5. The definition of "surfactant" differs from that in paragraph 6.3 of standard ISO 15825 as follows: "Surfactant" is an anionic surfactant of the type Nonidet P 40 Substitute from Fluka, obtainable from Sigma-Aldrich Chemie GmbH, Industriestrasse 25, CH-9471 Buchs SG, Switzerland.

6. The definition of spin fluid differs from that in paragraph 6.5 of standard ISO 15825 as follows: The spin fluid is produced by taking 0.25 g of Nonidet P 40 Substitute surfactant from Fluka (paragraph 6.3) and making it up to 1000 ml with demineralised water (paragraph 6.1). The pH of the solution is then adjusted to from 9 to 10 by using 0.1 mol/l NaOH solution. The maximum time between production of the spin fluid and use thereof is 1 week.

7. The definition of dispersion fluid differs from that in paragraph 6.6 of standard ISO 15825 as follows: The dispersion fluid is produced by taking 200 ml of ethanol (paragraph 6.2) and 0.5 g of Nonidet P 40 Substitute surfactant from Fluka (paragraph 6.3) and making it up to 1000 ml with demineralised water (paragraph 6.1). The pH of the solution is then adjusted to from 9 to 10 by using 0.1 mol/l NaOH solution. The maximum time between production of the dispersion fluid and use thereof is 1 week.

8. Supplement to paragraph 7 of standard ISO 15825: The carbon black used is exclusively unpelletized or pelletized.

9. The instructions in paragraphs 8.1, 8.2, and 8.3 of standard ISO 15825 are jointly replaced by the following instruction: The carbon black is gently crushed in an agate mortar, 20 ml of dispersion solution (paragraph 6.6) are then admixed with 20 mg of carbon black in a 30 ml beaded-rim bottle (diameter 28 mm, height 75 mm, wall thickness 1.0 mm) and the product is treated with ultrasound (paragraph 5.2) in a cooling bath (16° C.+/−1° C.) for a period of 4.5 minutes (paragraph 5.2.1) so that the carbon black becomes suspended in the dispersion solution. After the ultrasound treatment, the specimen is measured in the centrifuge within a period of at most 5 minutes.

10. Supplement to paragraph 9 of standard ISO 15825: The carbon black density value to be entered is 1.86 g/cm³. The temperature for the temperature to be entered is determined in accordance with paragraph 10.11. The option "aqueous" is selected for spin-fluid type. The resultant value for spin-fluid density is 0.997 (g/cc), and the resultant value for spin fluid viscosity is 0.917 (cP). The light-scattering correction is applied by using options selectable in the dcplw 32 software: file=carbon.prm; Mie correction.

11. Supplement to paragraph 10.1 of standard ISO 15825: The centrifuge speed is defined as 11 000 r/min.

12. Supplement to paragraph 10.2 of standard ISO 15825: 0.85 cm$^3$ of ethanol (paragraph 6.2) are injected instead of 0.2 cm$^3$ of ethanol (paragraph 6.2).

13. Supplement to paragraph 10.3 of standard ISO 15825: Exactly 15 cm$^3$ of spin fluid (paragraph 6.5) are injected. 0.15 cm$^3$ of ethanol (paragraph 6.2) is then injected.

14. The instruction of paragraph 10.4 of standard ISO 15825 is omitted entirely.

15. Supplement to paragraph 10.7 of standard ISO 15825: Immediately after the start of data recording, the spin fluid in the centrifuge is covered with 0.1 cm$^3$ of dodecane (paragraph 6.4).

16. Supplement to paragraph 10.10 of standard ISO 15825: If the measurement curve does not return to the base line within a period of one hour, the measurement is terminated after precisely 1 hour of measurement time, rather than restarting with a different centrifuge-rotation rate.

17. Supplement to paragraph 10.11 of standard ISO 15825: Instead of using the method described in the instructions for determining the measurement temperature, the measurement temperature T to be entered into the computer program is determined as follows:

$$T = \tfrac{2}{3}(Te - Ta) + Ta,$$

where Ta is the temperature of the measurement chamber prior to measurement and Te is the temperature of the measurement chamber after measurement. The temperature difference should not exceed 4° C.

The fraction of particles >150 nm in the aggregate size distribution can be smaller than 10% by weight, preferably smaller than 5% by weight, particularly preferably smaller than 3% by weight.

The fraction >150 nm is the proportion by weight of the aggregates having a Stokes diameter greater than 150 nm, and is likewise obtained from the aggregate size distribution in accordance with standard ISO 15825 described above.

The ΔD50 value and the Dmode are similarly obtained from the aggregate size distribution in accordance with standard ISO 15825 described above.

The D75%/25% ratio can be smaller than or equal to 3.50, preferably smaller than or equal to 2.50, very particularly preferably smaller than or equal to 1.40. The D75%/25% ratio is obtained from the aggregate size distribution in accordance with standard ISO 15825 described above.

The carbon black according to the invention can be a plasma black, gas black, channel black, thermal black, lamp black or furnace black.

The BET surface area of the carbon black of the invention can be from 10 to 400 m$^2$/g, preferably from 40 to 300 m$^2$/g, particularly preferably from 70 to 200 m$^2$/g. The BET surface area value is determined in accordance with standard ASTM D6556-04.

The carbon black of the invention can have a narrow primary particle distribution. This is determined to ASTM D3849-02. For the purposes of this study, the following values are determined: DV, the volume-average particle diameter, and DN, arithmetic average particle diameter. The DV/DN ratio of the primary particle distribution can be smaller than 1.14, preferably smaller than 1.12, particularly preferably smaller than 1.11.

The pH of the carbon black according to the invention can be from 2 to 11, preferably from 5 to 10, particularly preferably from 6 to 10. The pH is determined in accordance with standard ASTM D1512-05.

The OAN value of the carbon black according to the invention can be from 20 ml/100 g to 200 ml/100 g, preferably from 30 ml/100 g to 170 ml/100 g, particularly preferably from 40 ml/100 g to 140 ml/100 g. OAN absorption is determined in accordance with standard ASTM D2414-00.

The 24M4-OAN value of the carbon black according to the invention can be from 20 ml/100 g to 160 ml/100 g, preferably from 30 ml/100 g to 140 ml/100 g, particularly preferably from 50 ml/100 g to 120 ml/100 g. 24M4-OAN absorption is determined in accordance with standard ASTM D3493-00.

The tint value of the carbon black according to the invention can be from 10% to 250%, preferably from 50% to 200%, particularly preferably from 80% to 150%. Tint value is determined in accordance with standard ASTM D3265-05.

The iodine number of the carbon black according to the invention can be from 10 mg/g to 400 mg/g, preferably from 40 mg/g to 300 mg/g, particularly preferably from 70 mg/g to 200 mg/g. Iodine number is determined in accordance with standard ASTM D1510-06.

The CTAB value of the carbon black according to the invention can be from 10 m$^2$/g to 250 m$^2$/g, preferably from 15 m$^2$/g to 200 m$^2$/g, particularly preferably from 20 m$^2$/g to 180 m$^2$/g. CTAB value is determined in accordance with standard ASTM D3765-04.

The STSA value of the carbon black according to the invention can be from 10 m$^2$/g to 250 m$^2$/g, preferably from 15 m$^2$/g to 200 m$^2$/g, particularly preferably from 20 m$^2$/g to 180 m$^2$/g. The STSA value is determined in accordance with standard ASTM D6556-04.

The content of volatile constituents in the carbon black according to the invention can be from 0.2 to 2.5, preferably from 1.0 to 2.0, particularly preferably from 1.2 to 1.5. The content of volatile constituents is determined in accordance with standard DIN 53552.

The content of toluene-soluble constituents in the carbon black according to the invention can be from 0.01% to 0.15%, preferably from 0.02% to 0.1%, particularly preferably from 0.04% to 0.07%. The content of toluene-soluble constituents is determined in accordance with standard ASTM D4527-04.

The transmittance value of the carbon black according to the invention at 425 nm can be from 60% to 100%, preferably from 70% to 100%, particularly preferably from 80% to 100%. The transmittance value is determined in accordance with standard ASTM D1618-04.

The transmittance value of the carbon black according to the invention at 355 nm can be from 5% to 100%, preferably from 10% to 100%, particularly preferably from 20% to 100%. The transmittance value is determined in accordance with standard ASTM D1618-04.

The transmittance value of the carbon black according to the invention at 300 nm can be from 1% to 100%, preferably from 10% to 100%, particularly preferably from 20% to 100%. The transmittance value is determined in accordance with standard ASTM D1618-04.

The sulphur content of the carbon black according to the invention can be from 0% to 2.5%, preferably from 0.05% to 2.0%, particularly preferably from 0.1% to 1.5%. Sulphur content is determined in accordance with standard ASTM D1619-03.

The invention further provides a process for producing the carbon black according to the invention through thermal oxidative pyrolysis or thermal cleavage of the carbon black feedstock, which is characterized in that the carbon black feedstock comprises a renewable carbon black feedstock and the amount of oxygen present during the pyrolysis/cleavage reaction of the carbon black feedstock is substoichiometric.

A substoichiometric amount of oxygen means that the amount of oxygen present during the thermal oxidative pyrolysis or thermal cleavage is zero, or less than is needed for the stoichiometric conversion of carbon black feedstock to $CO_2$.

The carbon black according to the invention can be produced using a carbon black feedstock which has a C/H ratio of from 0.1 to 2.0, preferably from 0.3 to 1.7, particularly preferably from 0.4 to 1.4, with particular preference from 0.4 to 1.15. C/H ratio is determined in accordance with standard ASTM D5373-02 and standard ASTM 5291-02 by using a EuroEA 3000/HTO elemental analyser from Hekatech.

The reaction can be terminated through cooling to temperatures below the pyrolysis temperature or cleavage temperature.

The renewable carbon black feedstock can be biogas, rapeseed oil, soya oil, palm oil, sunflower oil, oils derived from nuts or olive oil.

The process according to the invention can be carried out in a furnace-black reactor.

The process of the invention can be carried out in a furnace-black reactor which, along the reactor axis, has a combustion zone, a reaction zone and a termination zone, by producing a stream of hot exhaust gas in the combustion zone through complete combustion of a fuel in a gas comprising oxygen, and passing the exhaust gas from the combustion zone through the reaction zone into the termination zone, mixing a carbon black feedstock into the hot exhaust gas in the reaction zone, and terminating carbon black formation in the termination zone by spraying water into the system.

The carbon black feedstock can comprise >0.001% by weight, preferably ≥0.1% by weight, particularly preferably ≥25% by weight, with particular preference ≥99% by weight, of renewable carbon black feedstock. The carbon black feedstock can consist of renewable carbon black feedstock.

The carbon black feedstocks can be introduced through nozzles by means of radial lances and/or axial lances. The renewable carbon black feedstock can be solid, liquid or gaseous. The solid renewable carbon black feedstock can be in a form dispersed in the carbon black feedstock. The liquid carbon black feedstock can be atomized by pressure, or by a vapour or compressed air.

The carbon black feedstock can be a mixture made of renewable carbon black feedstock and of liquid aliphatic or aromatic, saturated or unsaturated hydrocarbons or a mixture of these, or can be coal tar distillates or residual oils which are produced during the catalytic cracking of petroleum fractions or during olefin production through cracking of naphtha or gas oil.

The carbon black feedstock can be a mixture made of renewable carbon black feedstock and of gaseous carbon black feedstocks, for example gaseous aliphatic, saturated or unsaturated hydrocarbons, mixtures thereof or natural gas.

There is no restriction of the process according to the invention to any particular reactor geometry. It can be adapted to various reactor types and reactor sizes.

The carbon black feedstock atomizer used can comprise either simple pressure atomizers (single-fluid atomizers) or twin-fluid atomizers with internal or external mixing.

The carbon blacks according to the invention can be used as reinforcing or other filler, UV stabilizer, conductive carbon black or pigment. The carbon blacks according to the invention can be used in rubber and rubber mixtures, plastic, printing inks, inkjet inks and other inks, in toners, in lacquers, in paints, in paper, in adhesives, in batteries, in pastes, in bitumen, in concrete and in other construction materials. The carbon blacks according to the invention can be used as reducing agent in metallurgy.

The invention further provides polymer mixtures which are characterized in that they comprise at least one polymer and at least one carbon black of the invention.

Polymers can be plastics or rubbers.

Polymers can be starch or starch blends with polyester, with polyester amides, or with polyurethanes, or polyvinyl alcohol, or can be cellulose products, for example cellulose acetate (CA), vulcanized fibre, cellulose nitrate, cellulose propionate or cellulose acetobutyrate, polylactic acid (PLA), polyhydroxyalkanoates, for example polyhydroxybutyric acid (PHB), lignin, chitin, casein, gelatine, polytrimethylene terephthalate (PTT), polyamides, polybutylene succinates, polybutylene terephthalates, polycaprolatones, polyhydroxy-alkanoates, polyhydroxybutyrates, polyhydroxybutyrate-co-hydroxyalonates, polyhydroxybutyrate-co-hydroxy-hexanoates, polyactides, acrylonitrile-butadiene polymer, acrylonitrile-butadiene-acrylate plastic (ABA), acrylonitrile-butadiene-styrene polymer, acrylonitrile-chlorinated polyethylene-styrene, acrylo-nitrile-(ethylene-propylene-diene)-styrene (AEPDMS) polymer, acrylonitrile-methyl methacrylate polymer, acrylonitrile-styrene-acrylate polymer, cellulose acetopropionate, cellulose-formaldehyde polymer, cresol-formaldehyde polymer, carbon fibre plastic or carbon-fibre-reinforced plastics, carboxymethyl-cellulose, cycloolefin copolymer, chloroprene rubber, casein-formaldehyde polymer, cellulose triacetate, diallyl phthalate polymer, ethylene-acrylic acid polymer, ethylene-butyl acrylate plastic (EBA), ethyl cellulose, ethylene-ethyl acrylate polymer, ethylene-methacrylic acid polymer, epoxy polymer, epoxy resin ester, ethylene-propylene polymer, ethylene-tetrafluoroethylene polymer, ethylene-vinyl acetate (EVA) polymer, ethylene-vinyl alcohol polymer, perfluorinated ethylene propylene polymer, furan-formaldehyde polymer, generic term for fibre-reinforced plastics, glassfibre-reinforced epoxy resin, generic term for glassfibre-reinforced plastics, high-density polyethylene (HDPE), fabric-based laminate, liquid-crystal polymer, methyl methacrylate-butadiene-styrene polymer, methyl methacrylate-acrylonitrile-butadiene-styrene, methylcellulose, medium-density polyethylene (MDPE), melamine-formaldehyde polymer, melamine-phenol-formaldehyde polymer, α-methylstyrene-acrylonitrile plastic, nitrile rubber, nitrocellulose, non crimp fabrics polymer, natural rubber, polyamide, polyacrylic acid, polyaryl ether ketone, polyamideimide, polyacrylate, polyacrylonitrile, polyarylate, polyarylamide, polybutene, polybutyl acrylate, 1,2-polybutadiene, polybutene naphthalate, polybutylene terephthalate, polycarbonate, polycyclohexenedimethylene cyclohexanedicarboxylate, polycarbodiimide, polycaprolactone, polycyclohexenedimethylene terephthalate, polychlorotrifluoroethylene, polydiallyl phthalate, polydicyclopentadiene, polyethylene, chlorinated polyethylene (CPE), low-density polyethylene (LDPE), linear low-density polyethylene (LLDPE), ultrahigh-molar-mass polyethylene (UHMWPE), very low-density polyethylene (VLDPE), polyester carbonate, polyether ether ketone, polyether ester, polyetherimide, polyether ketone, polyethylene naphthalate, polyethylene oxide, ethylene-propylene polymer, polyether sulphone, polyester urethane, polyethylene terephthalate, polyether urethane, phenol-formaldehyde, perfluoroalkoxyalkane, polyimide, polyiso-butylene, polyisocyanurate, polyketone, polymethacrylimide, polymethyl methacrylate, poly-N-methylmethacrylimide, poly-4-methyl-(1)-pentene, poly-α-methylstyrene, polyoxymethylene; polyformaldehyde, polypropylene, chlorinated polypropylene, expandable polypropylene (EPP), high-impact-resistance polypropylene (HIPP), polyphenylene ether, polypropylene oxide, polyphenylene sulphide, polyphenylene sulphone, polystyrene, expandable polystyrene (EPS), high-impact-resistance polystyrene (HIPS), polysulphone, polytetrafluoroethylene, polytrimethylene terephthalate, polyurethane (PU), polyvinyl acetate, polyvinyl alcohol (PVOH), polyvinyl butyrate, polyvinyl chloride, vinyl chloride-vinyl acetate polymer, chlorinated polyvinyl chloride (CPVC), high-impact-resistance polyvinyl chloride, unplasticized polyvinyl chloride (UPVC), polyvinylidene chloride, polyvinylidene fluoride, polyvinyl fluoride, polyvinyl formal, polyvinylcarbazole, polyvinylpyrrolidone, styrene-acrylonitrile polymer, styrene-butadiene polymer, styrene-butadiene rubber, silicone polymer, styrene-maleic anhydride (SMA) polymer, styrene-α-methylstyrene polymer, saturated polyester, urea-formaldehyde polymer, ultrahigh-molecular-mass polyethylene, unsaturated polyester, vinyl chloride polymer, vinyl chloride-ethylene polymer, vinyl chloride-ethylene-methyl acrylate (VCEMA) polymer, vinyl chloride-ethylene-vinyl acetate polymer, vinyl chloride-methyl acrylate (VCMA) polymer, vinyl chloride-methyl methacrylate polymer, vinyl chloride-octyl acrylate (VCOA) polymer, vinyl chloride-vinyl acetate polymer, vinyl chloride-vinylidene chloride polymer, vinyl ester resin, and crosslinked polyethylene.

The invention further provides rubber mixtures which are characterized in that they comprise at least one rubber and at least one carbon black according to the invention.

The amounts that can be used of the carbon black according to the invention are from 10 to 150% by weight, preferably from 40 to 100% by weight, particularly preferably from 60 to 80% by weight, based on the amount of the rubber used.

The rubber mixture according to the invention can comprise silica, preferably precipitated and fumed silicas, and also naturally occurring, mineral, silicatic, lime-type or lime-containing fillers. The rubber mixture according to the invention can comprise organosilanes, such as bis(trialkoxysilylalkyl) oligo- or polysulphide, for example bis(triethoxysilylpropyl) disulphide or bis(triethoxysilylpropyl) tetrasulphide, or mercaptosilanes.

Mercaptosilanes can be compounds of the general formula I

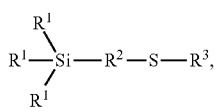

I where $R^1$ is identical or different and is an alkyl polyether group $-O-(R^4-O)_m-R^6$, C1-C12-alkyl or $R^6O$ group, where $R^4$ is identical or different, and is a branched or unbranched, saturated or unsaturated, aliphatic bivalent C1-C30 hydrocarbon group, preferably $CH_2-CH_2$, $CH_2-$ $CH(CH_3)$, $-CH(CH_3)-CH_2-$, $CH_2-CH_2-CH_2$ or a mixture thereof, m is on average from 1 to 30, preferably from to 20, particularly preferably from 2 to 15, very particularly preferably from 3 to 10, $R^5$ is composed of at least 1, preferably at least 12, carbon atoms and is an unsubstituted or substituted, branched or unbranched monovalent alkyl, alkenyl, aryl or aralkyl group, and $R^6$ is H, methyl, ethyl, propyl, C9-C30 branched or unbranched monovalent alkyl, alkenyl, aryl, or aralkyl group or an $(R^7)_3Si$ group, where $R^7$ is a C1-C30 branched or unbranched alkyl or alkenyl group, $R^2$ is a branched or unbranched, saturated or unsaturated, aliphatic, aromatic or mixed aliphatic/aromatic divalent C1-C30 hydrocarbon group and $R^3$ is H, CN or $(C=O)-R^8$, where $R^8$ is a branched or unbranched, saturated or unsaturated, aliphatic, aromatic or mixed aliphatic/aromatic monovalent C1-C30, preferably C5 to C30, particularly preferably C5 to C20, very particularly preferably C7 to C15, extremely preferably C7 to C11, hydrocarbon group.

The rubber mixture according to the invention can comprise at least one carbon black according to the invention, precipitated or fumed silica, naturally occurring mineral, silicatic, lime-type or lime-containing fillers and an organosilane.

The rubber mixture according to the invention can comprise rubber auxiliaries.

Materials suitable for producing the rubber mixtures according to the invention are not only natural rubber but also synthetic rubbers. Examples of preferred synthetic rubbers are described in W. Hofmann, Kautschuktechnologie [Rubber technology], Genter Verlag, Stuttgart 1980. They comprise inter alia
   polybutadiene (BR),
   polyisoprene (IR),
   styrene/butadiene copolymers, such as emulsion SBR (ESBR) or solution SBR (SSBR), preferably having styrene content of from 1 to 60% by weight, particularly preferably from 2 to 50% by weight, based on the entirety of the polymer,
   chloroprene (CR),
   isobutylene/isoprene copolymers (IIR),
   butadiene/acrylonitrile copolymers, preferably having acrylonitrile content of from 5 to 60% by weight, preferably from 10 to 50% by weight, based on the entirety of the polymer (NBR),
   partially or fully hydrogenated NBR rubber (HNBR),
   ethylene/propylene/diene copolymers (EPDM) or
   abovementioned rubbers additionally having functional groups, such as carboxy, silanol, or epoxy groups, examples being epoxidized NR, carboxy-functionalized NBR, or silanol- (—SiOH) or siloxy-functionalized (—Si—OR) SBR,
   and also mixtures of these rubbers.

In particular, car tyre treads can be produced by using anionically polymerized SSBR rubbers (solution SBR) with glass transition temperature above −50° C., or else a mixture of these with diene rubbers.

The rubber mixtures of the invention can comprise further rubber auxiliaries, such as reaction accelerators, antioxidants, heat stabilizers, light stabilizers, antiozonants, processing aids, plasticizers, tackifiers, blowing agents, dyes, pigments, waxes, extenders, organic acids, retarders, metal oxides, and also activators, such as diphenylguanidine, triethanolamine, polyethylene glycol, alkoxy-terminated polyethylene glycol, or hexanetriol, these being known in the rubber industry.

The amounts used of the rubber auxiliaries can be conventional, depending inter alia on the intended use. Examples of conventional amounts can be amounts of from 0.1 to 50% by weight, based on rubber.

Crosslinking agents that can be used are sulphur, organic sulphur donors, or free radical generators. The rubber mixtures of the invention can moreover comprise vulcanization accelerators.

Examples of suitable vulcanization accelerators are mercaptobenzothiazoles, sulphenamides, guanidines, thiurams, dithiocarbamates, thioureas and thiocarbonates.

The amounts that can be used of the vulcanization accelerators and crosslinking agents are from 0.1 to 10% by weight, preferably from 0.1 to 5% by weight, based on rubber.

The blending of the rubbers with the filler, and if appropriate with rubber auxiliaries, and the organosilanes, can be conducted in or on conventional mixing assemblies, such as rolls, internal mixers, and mixing extruders. Rubber mixtures of this type can usually be produced in an internal mixer, beginning with one or more successive thermomechanical mixing stages in which the following are incorporated: the rubbers, the carbon black according to the invention, if appropriate the silica, and the organosilane, and the rubber auxiliaries, at from 100 to 170° C. The sequence of addition and the juncture of addition of the individual components can have a decisive effect here on the properties obtained from the mixture. The crosslinking chemicals are then usually admixed with the resultant rubber mixture in an internal mixer or on a roll at from 40 to 120° C., the mixture then being processed to give what is known as the crude mixture for the process steps that follow, examples being shaping and vulcanization.

The vulcanization of the rubber mixtures of the invention can take place at temperatures of from 80 to 200° C., preferably from 130 to 180° C., if appropriate under pressure of from 10 to 200 bar.

The rubber mixtures of the invention are suitable for production of mouldings, e.g. for the production of pneumatic and other tyres, tyre treads, cable sheathing, hoses, drive belts, conveyor belts, roll coverings, shoe soles, sealing rings, profiles and damping elements.

The invention further provides plastics mixtures which are characterized in that they comprise at least one plastic and comprise at least one carbon black of the invention.

By way of example, plastics can be PE, PP, PVA or TPEs. The plastics mixtures of the invention can be used for producing cables, pipes, fibres, foils, in particular agricultural foils, engineering plastics and injection-moulded items.

The invention further provides inks which are characterized in that they comprise at least one carbon black of the invention.

The invention further provides printing inks which are characterized in that they comprise at least one carbon black of the invention.

The carbon black according to the invention has the advantage of high C-14 content and therefore high content of carbon derived from renewable raw material. Fossil $CO_2$ emission is thus reduced. Another advantage is narrow aggregate size distribution and the high modulus associated therewith.

EXAMPLES

Example 1

Carbon Black Production

The carbon black reactor shown in FIG. 1 is used to produce a series of carbon blacks according to the invention.

FIG. 1 shows a longitudinal section through the furnace reactor. The carbon black reactor has a combustion chamber in which the hot process gas for the pyrolysis of the carbon black oil is produced through combustion of natural gas with introduction of an excess of atmospheric oxygen.

The combustion air and the fuel are introduced by way of the apertures 1 in the end of the combustion chamber. The combustion chamber narrows in the manner of a cone towards the narrowest section. The carbon black feedstock is introduced at the narrowest section through nozzles by way of radial lances 3 and/or axially by way of lance 2. After passage through the narrowest section, the reaction gas mixture expands into the reaction chamber.

In the termination zone, water is sprayed into the system through the quench-water lance 4.

The list below gives the dimensions of the reactor used:

| | |
|---|---|
| Maximum combustion chamber diameter: | 220 mm |
| Combustion chamber length as far as narrowest section: | 556 mm |
| Length of conical portion of combustion chamber: | 256 mm |
| Diameter at narrowest section: | 44 mm |
| Length of narrowest section: | 100 mm |
| Reaction chamber diameter: | 200 mm |
| Maximum position of quench-water lance(s) [1] | 6160 mm |

[1] measured from entry into the narrowest section (+: after entry −: prior to entry)

The fuel used to produce the carbon blacks comprises natural gas and a carbon black oil with carbon content 91.3% by weight and hydrogen content 7.87% by weight.

Table 1 lists the reactor parameters for producing carbon blacks according to the invention. Five different carbon blacks are produced (carbon blacks CB1 to CB5). The production conditions differ in particular in relation to the amount of the carbon black feedstock injected at the narrowest section.

TABLE 1

| Reactor parameter | Unit | CB1 Comparative carbon black | CB2 | CB3 | CB4 | CB5 |
|---|---|---|---|---|---|---|
| Combustion air | Nm³/h | 200 | 200 | 200 | 200 | 200 |
| Combustion air temperature | ° C. | 516 | 520 | 520 | 520 | 520 |
| Fuel (natural gas) | Nm³/h | 14 | 14 | 14 | 14 | 14 |
| Carbon black feedstock | kg/h | 36 | 24 | 26 | 30 | 34 |
| Rapeseed oil content in carbon black feedstock | % by weight | 0 | 100 | 75 | 50 | 14 |
| Temperature of carbon black feedstock | ° C. | 120 | 120 | 120 | 120 | 120 |
| Atomization medium | m³ N₂ | 4 | 4 | 4 | 4 | 4 |
| Additive (K₂CO₃) | g/h | — | — | — | — | — |
| Quench position[1] | mm | 4290 | 4290 | 4290 | 4290 | 4290 |

[1] Measured from entry into the narrowest section

The properties of the resultant carbon blacks are determined in accordance with the following standards and have been listed in Table 2:

| | |
|---|---|
| CTAB surface area: | ASTM D3765 |
| Iodine number: | ASTM D1510 |

-continued

| | |
|---|---|
| STSA: | ASTM D6556 |
| BET: | ASTM D6556 |
| OAN absorption: | ASTM D2414-00 |
| 24M4-OAN absorption: | ASTM D3493-00 |
| pH: | ASTM D1512 |
| Transmittance: | ASTM D1618-04 |
| Sulphur content: | ASTM D1619-03 |
| Toluene-soluble fractions: | ASTM D4527-04 |
| Volatile constituents: | DIN 53552 |
| Tint: | ASTM D3265-05 |

The ΔD50 value is the width of the aggregate size distribution curve at half peak height. The Dw value is the weight-average of the aggregate size distribution. The Dmode value is the most frequent aggregate size (peak maximum of the aggregate size distribution curve). The D75%/25% ratio is calculated by taking the quotient of that particle diameter for which 75% of the particles are smaller and 25% of the particles are larger and that particle diameter for which 25% of the particles are smaller and 75% are larger, based on the entire aggregate size distribution by weight.

TABLE 3

| Substance 1st stage | Formulation [phr] |
|---|---|
| Krynol 1712 | 137.5 |
| Carbon black | 75 |
| ZnO | 3 |
| Stearic acid | 1.5 |
| Rhenogran DPG-80 | 0.25 |
| Rhenogran TBBS-80 | 1.5 |
| Rhenogran S-80 | 2.25 |

The polymer Krynol 1712 is an oil-extended ESBR from Bayer AG with styrene content of 23.5%. The polymer comprises 37.5 phr of oil and its Mooney viscosity (ML 1+4/100° C.) is 51.

Rhenogran DPG-80 is an elastomer-bound DPG from Bayer AG, Rhenogran TBBS-80 is an elastomer-bound TBBS from Bayer AG and Rhenogran S-80 is an elastomer-bound sulphur from Bayer AG.

The rubber mixtures are produced in an internal mixer in accordance with the mixing specification in Table 4.

TABLE 2

| | | Sample | | | | | | |
|---|---|---|---|---|---|---|---|---|
| | | N375 | N220 | CB1 | CB2 | CB3 | CB4 | CB5 |
| Rapeseed oil content | % | — | — | 0 | 100 | 75 | 50 | 14 |
| | | Ref. | Ref. | Ref. | | | | |
| Analysis | | | | | | | | |
| CTAB | m²/g | 94 | 110 | 105 | 100 | 121 | 108 | 108 |
| Iodine number | mg/g | 91 | 120 | 109 | 77 | 117 | 112 | 111 |
| BET | m²/g | 92 | 113 | 109 | 95 | 127 | 113 | 109 |
| STSA | m²/g | 91 | 109 | 105 | 94 | 118 | 107 | 105 |
| OAN | ml/100 g | 112 | 114 | 135 | 108 | 122 | 132 | 102 |
| 24M4 OAN | ml/100 g | 97 | 101 | 90 | 79 | 86 | 89 | 81 |
| Tint | % | 116 | 117 | 128 | 124 | 136 | 129 | 127 |
| Transmittance at 425 nm | % | 74 | 100 | 100 | 73 | 100 | 100 | 100 |
| Transmittance at 355 nm | % | 5 | 99 | 91 | 8 | 95 | 93 | 95 |
| Transmittance at 300 nm | % | 0.6 | 98 | 53 | 2 | 71 | 61 | 57 |
| pH | — | 7.4 | 7.1 | 7.5 | 8.0 | 6.7 | 7.0 | 7.1 |
| Sulphur content | % | 0.16 | 0.10 | 0.37 | 0.05 | 0.21 | 0.27 | 0.36 |
| Toluene-soluble fractions | % | 0.09 | 0.02 | 0.01 | 0.10 | 0.04 | 0.04 | 0.04 |
| Volatile fractions at 950° C. | % | 2.09 | 1.77 | 1.54 | 1.38 | 1.77 | 1.70 | 1.52 |
| Dw | nm | 85 | 77 | 79 | 71 | 67 | 76 | 72 |
| Dmode | nm | 80 | 74 | 74 | 68 | 62 | 72 | 66 |
| Δ D 50 | nm | 60 | 54 | 53 | 37 | 42 | 45 | 47 |
| D75%/25% ratio | — | 1.52 | 1.49 | 1.49 | 1.36 | 1.43 | 1.42 | 1.48 |
| Fraction > 150 nm | % | 2 | 0 | 1 | 0 | 0 | 1 | 1 |
| Δ D 50/Dmode | — | 0.75 | 0.73 | 0.72 | 0.54 | 0.68 | 0.63 | 0.71 |
| C/H ratio of carbon black feedstock | — | | | 1.2 | 0.6 | 0.7 | 0.8 | 1.1 |
| C-14 content | % | <DL | <DL | (<DL) <0.04 | 0.26 | 0.16 | 0.10 | 0.06 |

(DL = detection limit of 0.04%)

Example 2

Vulcanizate Tests

Table 3 below gives the formulation used for the rubber mixtures, where the unit phr means content by weight, based on 100 parts of the crude rubber used.

The general process used to produce rubber mixtures and vulcanizates from these has been described in the following book: "Rubber Technology Handbook", W. Hofmann, Hanser Verlag 1994.

TABLE 4

| Stage 1 | |
|---|---|
| Settings | |
| Mixing assembly | Rheomix 3010 P |
| Rotation rate | 40 min⁻¹ |
| Ram pressure | 5 bar |
| Capacity | 0.38 L |
| Fill level | 0.66 |
| Chamber temperature | 70° C. |

TABLE 4-continued

Stage 1

| Mixing procedure | |
|---|---|
| 0 to 1 min | Krynol 1712 |
| 1 to 6 min | ZnO, stearic acid, Rhenogran DPG-80, carbon black |
| 6 to 8.5 min | Rhenogran TBBS-80, Rhenogran S-80, |
| 8.5 min | discharge |
| 8.5 to 10.5 min | form milled sheet on laboratory roll mill (roll temperature 50° C., friction 1:1.4, 24:34 min$^{-1}$) Roll the material 5 times with 0.8 mm nip, draw off milled sheet. |

Table 5 collates the methods for rubber testing.

TABLE 5

| Physical testing | Standard/conditions |
|---|---|
| Vulcameter testing | DIN 53529/3, ISO 6502 |
| Shore A hardness | DIN 53505, ISO 7619-1 |
| Ball Rebound, 60° C. (%) | ASTM D2632-01 |
| Viscoelastic properties | DIN 53513, ISO 4664-1 |
| Ring tensile test | DIN 53504, ISO 37 |
| Goodrich flexometer test | DIN 53533, ASTM D623 A |
| 0.175 inch displacement, 120 min, 23° C. | |
| Contact temperature (° C.) | |
| Needle temperature (° C.) | |
| Residual deformation (%) | |

Table 6 shows the results from vulcanizate testing. The mixtures are vulcanized to t95% in the rheometer test, but for no longer than 30 min at 170° C.

The results in Table 6 show that the carbon blacks according to the invention have narrower aggregate size distribution (ΔD50/Dmode) and a higher level of reinforcement (modulus).

The results in Table 6 show that the use of rapeseed oil as renewable carbon black feedstock in various blends with non-renewable carbon black feedstock can produce a carbon black according to the invention which is characterized by narrower aggregate size distribution when compared with the reference and when used in tyre treads leads to reduced tyre abrasion and therefore to longer tyre lifetime (prolonged tyre lifetime thus reducing $CO_2$ level) and which, when compared with the reference, despite a markedly lower level of 24M4-OAN structure, has a similarly high level of reinforcement (similar to a high 300% modulus).

Use of rapeseed oil as renewable carbon black feedstock in various blends with non-renewable carbon black feedstock can improve $CO_2$ balance.

The invention claimed is:

1. A process for producing furnace carbon black, the carbon black comprising
    a C-14 content greater than 0.05 Bq/g; and
    a ΔD50/Dmode ratio of the aggregate size distribution less than 0.7, the process comprising
    thermal oxidative pyrolysis or thermal cleavage of a carbon black feedstock in a furnace-black reactor, wherein
    the carbon black feedstock comprises a renewable carbon black feedstock and the amount of oxygen present during the pyrolysis/cleavage reaction of the carbon black feedstock is substoichiometric, and

TABLE 6

| | | Sample | | | | | | |
|---|---|---|---|---|---|---|---|---|
| | | N375 | N220 | CB1 | CB2 | CB3 | CB4 | CB5 |
| Rapeseed oil content | % | — | — | 0 | 100 | 75 | 50 | 14 |
| | | Ref. | Ref. | Ref. | | | | |
| Crude mixture | | | | | | | | |
| Dmin | dNm | 3.36 | 3.85 | 4.01 | 3.52 | 4.50 | 3.99 | 3.64 |
| Dmax-Dmin | dNm | 13.65 | 13.79 | 14.32 | 13.78 | 14.81 | 14.30 | 14.04 |
| t 10% 170° C. | min | 1.45 | 1.60 | 1.49 | 1.27 | 1.44 | 1.45 | 1.49 |
| t 95% 170° C. | min | 6.17 | 6.63 | 6.22 | 5.90 | 6.35 | 6.48 | 6.60 |
| Vulcanizate | | | | | | | | |
| Tensile strength | MPa | 20.9 | 20.1 | 20.5 | 20.6 | 21.0 | 19.0 | 19.7 |
| 100% modulus | MPa | 1.9 | 1.9 | 2.1 | 1.9 | 1.9 | 1.9 | 1.7 |
| 300% modulus | MPa | 10.5 | 9.7 | 10.3 | 10.0 | 9.5 | 9.9 | 8.5 |
| Elongation at break | % | 515 | 525 | 525 | 525 | 550 | 495 | 555 |
| Shore A hardness | — | — | 66 | 68 | 68 | 66 | 69 | 68 | 66 |
| Goodrich flexometer | | | | | | | | |
| 0.175 inch/2 h | | | | | | | | |
| contact temperature | ° C. | 79 | 89 | 91 | 82 | 97 | 95 | 87 |
| needle temperature | ° C. | 133 | 149 | 151 | 139 | 149 | 155 | 145 |
| residual deformation | % | 10.7 | 13.1 | 12.2 | 12.8 | 13.9 | 13.8 | 11.0 |
| Ball Rebound, 60° C. | % | 47.0 | 42.7 | 42.0 | 43.3 | 40.4 | 42.2 | 42.2 |
| MTS E* 60° C. 1 +/− 0.5 mm | MPa | 10.8 | 11.3 | 12.0 | 11.1 | 12.5 | 12.4 | 10.9 |
| MTS E" 60° C. 1 +/− 0.5 mm | MPa | 3.26 | 3.71 | 4.04 | 3.76 | 4.46 | 4.14 | 3.70 |
| MTS tan δ 60° C. 1 +/− 0.5 mm | — | 0.323 | 0.352 | 0.358 | 0.360 | 0.379 | 0.356 | 0.366 |
| MTS E* 60° C. 50 +/− 25 N | MPa | 10.27 | 10.67 | 11.6 | 10.8 | 12.7 | 12.3 | 10.1 |
| MTS E" 60° C. 50 +/− 25 N | MPa | 2.61 | 2.98 | 3.36 | 3.04 | 3.90 | 3.63 | 2.93 |
| MTS tan δ 60° C. 50 +/− 25 N | — | 0.263 | 0.292 | 0.304 | 0.296 | 0.324 | 0.307 | 0.305 | the renewable carbon black feedstock comprises: rapeseed oil; soya oil; palm oil; sunflower oil; oils derived from nuts; olive oil; or a combination thereof.

2. The process of claim 1, further comprising terminating the reaction by cooling to temperatures below the pyrolysis temperature or cleavage temperature.

3. The process of claim 1,
wherein the furnace-black reactor comprises, along the reactor axis, a combustion zone, a reaction zone and a termination zone, and
wherein carrying out the reaction comprises
producing a stream of hot exhaust gas in the combustion zone through complete combustion of a fuel in a gas comprising oxygen,
passing the exhaust gas from the combustion zone through the reaction zone into the termination zone,
mixing the carbon black feedstock into the hot exhaust gas in the reaction zone, and
terminating carbon black formation in the termination zone by spraying water into the system.

4. A method of producing a product with a carbon black, comprising
producing a furnace carbon black in accord with the process of claim 1; and
introducing the furnace carbon black to a composition that is suitable for forming at least one of: a rubber, a rubber mixture, a plastic, a printing ink, an inkjet ink, an ink, a toner, a lacquer, a paint, paper, an adhesive, a battery, a paste, bitumen, concrete, a construction material.

5. A method of producing a product with a rubber mixture, comprising
producing a furnace carbon black in accord with the process of claim 1;
producing a rubber mixture by introducing the furnace carbon black to a composition suitable for making a rubber mixture; and
introducing the rubber mixture as, or as a part of, a composition that is suitable for forming at least one of: a tyre, tyre treads, cable sheathing, a hose, a drive belt, a conveyor belt, a roll covering, a shoe sole, a sealing ring, a profile element, and a damping element.

6. The process of claim 2,
wherein the furnace-black reactor comprises, along the reactor axis, a combustion zone, a reaction zone and a termination zone, and
wherein carrying out the reaction comprises
producing a stream of hot exhaust gas in the combustion zone through complete combustion of a fuel in a gas comprising oxygen,
passing the exhaust gas from the combustion zone through the reaction zone into the termination zone,
mixing the carbon black feedstock into the hot exhaust gas in the reaction zone, and
terminating carbon black formation in the termination zone by spraying water into the system.

7. A method of producing a product with a carbon black, comprising
producing a furnace carbon black in accord with the process of claim 1; and
introducing the furnace carbon black to a composition as a reducing agent in a metallurgy process.

8. The process of claim 1, wherein the resulting carbon black comprises a C-14 content greater than 0.10 Bq/g.

9. The process of claim 1, wherein the resulting carbon black comprises a C-14 content greater than 0.15 Bq/g.

10. The process of claim 1, wherein the resulting carbon black comprises a C-14 content greater than 0.25 Bq/g.

11. The process of claim 1, wherein the resulting carbon black comprises a C-14 content from greater than 0.05 Bq/g to 0.26 Bq/g.

12. The process of claim 1, wherein the resulting carbon black comprises a $\Delta D50/Dmode$ ratio of the aggregate size distribution from less than 0.6 to 0.54.

* * * * *